United States Patent [19]

Smith

[11] Patent Number: 5,049,187
[45] Date of Patent: * Sep. 17, 1991

[54] AQUEOUS SOLUTION FOR FORMING A FIRE-RETARDANT PROTECTIVE COATING

[75] Inventor: Thomas M. Smith, Spencerport, N.Y.

[73] Assignee: Eastman Kodak Company, Rochester, N.Y.

[*] Notice: The portion of the term of this patent subsequent to Jul. 23, 2008 has been disclaimed.

[21] Appl. No.: 498,782

[22] Filed: Mar. 26, 1990

[51] Int. Cl.$^5$ .................................................. C09K 21/04
[52] U.S. Cl. .............................. 106/18.17; 106/18.11; 106/18.14; 106/18.15; 106/18.16; 106/18.18; 252/609; 524/416
[58] Field of Search ............... 106/18.14, 18.15, 18.16, 106/18.17, 18.18, 18.11; 252/609; 524/416

[56] References Cited

U.S. PATENT DOCUMENTS

| | | | |
|---|---|---|---|
| 3,345,289 | 10/1967 | Freifeld et al. | 252/8.1 |
| 3,513,114 | 5/1970 | Hahn et al. | 260/8 |
| 3,562,197 | 2/1971 | Sears et al. | 260/28.5 |
| 3,955,987 | 5/1976 | Schaar et al. | 106/15 FP |
| 4,009,137 | 2/1977 | Dany et al. | 260/29.6 MP |
| 4,247,435 | 1/1981 | Kasten | 260/29.6 MP |
| 4,588,510 | 5/1986 | Salyer et al. | 252/5 |

Primary Examiner—William R. Dixon, Jr.
Assistant Examiner—Anthony J. Green
Attorney, Agent, or Firm—Alfred P. Lorenzo

[57] ABSTRACT

An aqueous solution useful as a coating composition to form a fire-retardant protective overcoat on a surface requiring such protection, such as one or both surfaces of a photographic element, comprises (1) a water-soluble film-forming cross-linkable copolymer of methyl vinyl ether and maleic anhydride, (2) a water-soluble polyhydric alcohol which serves to cross-link the copolymer when a coating of the composition is applied over the surface to be protected and dried, and (3) a water-soluble ammonium polyphosphate which reacts with the polyhydric alcohol to form a fire-retardant composition when the protective overcoat is exposed to the heat of a fire.

4 Claims, No Drawings

AQUEOUS SOLUTION FOR FORMING A FIRE-RETARDANT PROTECTIVE COATING

CROSS-REFERENCE TO RELATED APPLICATIONS

U.S. Pat. application Ser. No. 498,783 filed Mar. 26, 1990, "Photographic Element Having A Fire-Retardant Protective Overcoat", by T. M. Smith, relates to photographic elements which include a fire-retardant protective overcoat formed from the aqueous solution described and claimed herein.

FIELD OF THE INVENTION

This invention relates in general to fire-retardant protective coatings and in particular to a solution useful for forming such fire-retardant protective coatings. More specifically, this invention relates to an aqueous solution which is especially useful in treating photographic elements to provide on one or both surfaces thereof a protective overcoat which has fire-retardant properties.

BACKGROUND OF THE INVENTION

Photographic elements having protective overcoat layers are well known and a wide variety of different coating compositions have been proposed in the past for use as protective overcoats. Such overcoats serve a number of different purposes, such as to provide protection against fingerprints, abrasion and scratching, to protect against water spotting, to provide a particular surface texture such as a matte surface, to provide protection against blocking, and to act as anti-reflection layers which reduce glare. Layers of a temporary nature which are intended to be removed after they have served their purpose and layers which are permanently bonded to the photographic element have been described in the prior art. Protective overcoats can be applied to photographic elements by coating solutions or dispersions of film-forming agents in organic solvents such as described, for example, in U.S. Pat. Nos. 2,259,009; 2,331,746; 2,706,686; 3,113,867; 3,190,197 and 3,415,670; by coating of aqueous film-forming compositions such as are described, for example, in U.S. Pat. Nos. 2,173,480; 2,798,004; 3,502,501 and 3,733,293; by coating of compositions containing discrete, transparent, solid particles of submicroscopic size as described in U.S. Pat. No. 2,536,764; by coating of plasticized polymer compositions as described in U.S. Pat. No. 3,443,946; by coating of polymerized perfluorinated olefins as described in U.S. Pat. No. 3,617,354; by lamination of a protective layer as described, for example, in U.S. Pat. Nos. 3,397,980 and 3,697,277; by radiation-curing of a composition comprising an acrylated urethane, an aliphatic ethylenically unsaturated carboxylic acid and a multi-functional acrylate as described in U.S. Pat. Nos. 4,092,173 and 4,171,979; by radiation-curing of a composition comprising an acrylated urethane, an aliphatic ethylenically unsaturated carboxylic acid, a multi-functional acrylate and a siloxy-containing polycarbinol as described in U.S. Pat. No. 4,333,998; and by radiation-curing of a composition comprising a polymerizable epoxy compound, a cationic initiator, a polymerizable acrylic compound, a haloalkylated aromatic ketone and a polymerizable organofunctional silane as described in U.S. Pat. No. 4,426,431.

Typically, protective overcoats for photographic elements are not required to possess fire-retardant properties. However, certain well known photographic products are intended primarily for large displays. These products include opaque, front-lit materials and transparent or translucent materials which are intended for back-lit applications. Each of these products employs a polymeric support, such as, for example, a support formed from polyethylene terephthalate. When used as back-drops on movie sets, or as free-hanging murals at trade shows, etc, there is a critical need to reduce the flammability of these products so as to reduce the risk of fire. Accordingly, there exists in the photographic art a critical need for a coating composition that can be used to form a fire-retardant protective overcoat on a photographic element.

Numerous compositions have been proposed in the prior art as being suitable for application to combustible materials to render them fire-retardant. However, some of these compositions are opaque and thus unsuitable for use with photographic elements, some are applied from toxic or flammable solvents, some produce relatively toxic combustion products, and some interact with conventional photographic images to result in unwanted color shifts.

The use of phosphorus-containing compounds in forming fire-retardant compositions is very well known and, in relation to use with photographic display materials, such compounds are clearly advantageous as compared to the use of halogented flame retardants which can generate toxic combustion products. It is also well known to incorporate phosphorus-containing compounds in aqueous film-forming coating compositions used to form fire-retardant protective overcoats, and the ability to use an aqueous composition is especially important in the photographic field. A wide variety of aqueous compositions which include phosphorus-containing compounds have been described heretofore in the patent and technical literature. Thus, for example, U.S. Pat. No. 3,345,289 describes fire-retardant compositions containing diammonium phosphate and a polymeric thickener such as a copolymer of methyl vinyl ether and maleic anhydride; U.S. Pat. No. 3,513,114 describes fire-retardant compositions containing polyvinyl acetate, a solvent plasticizer, a carbonific and an ammonium polyphosphate; U.S. Pat. No. 3,562,197 describes fire-retardant compositions containing certain water-insoluble ammonium polyphosphates; U.S. Pat. No. 3,955,987 describes fire-retardant compositions containing monoammonium phosphate and/or diammonium phosphate, urea and/or cyanoguanidine, sucrose and titanium dioxide; U.S. Pat. No. 4,009,137 describes fire-retardant compositions containing a film-forming binder, a carbonific, a dispersing aid and an ammonium polyphosphate; U.S. Pat. No. 4,247,435 describes fire-retardant compositions comprising a carbonific, a film-forming binder, a phosphorus-containing material and an organic chelating agent; and U.S. Pat. No. 4,588,510 describes fire-retardant compositions comprising diammonium phosphate, a polyol, a gas-generating agent and a viscosity builder. These previously disclosed coating compositions serve many useful purposes, but none is capable of meeting the critical needs of the photographic art in relation to providing fire protection for large area display materials.

It is toward the objective of providing an aqueous solution capable of being coated on a photographic element to provide a fire-retardant overcoat meeting the critical needs of the photographic art, that the present invention is directed.

SUMMARY OF THE INVENTION

In accordance with this invention, an aqueous coating composition for use in forming a fire-retardant protective overcoat on a surface requiring such protection is comprised of (1) a water-soluble film-forming cross-linkable copolymer of methyl vinyl ether and maleic anhydride, (2) a water-soluble polyhydric alcohol which serves to cross-link the copolymer when a coating of the composition is applied over the surface and dried, and (3) a water-soluble ammonium polyphosphate which reacts with the polyhydric alcohol to form a fire-retardant composition when the protective overcoat is exposed to the heat of a fire.

Since all three of the components necessary to form the fire-retardant protective overcoat, namely the copolymer of methyl vinyl ether and maleic anhydride, the polyhydric alcohol and the ammonium polyphosphate, are compatible and water-soluble, they are readily coated from aqueous solution. A coating of the aqueous solution is applied over one or both surfaces of a photographic element or other material requiring protection against fire and, upon drying, the polyhydric alcohol reacts with the copolymer to effectively cross-link it and thereby render it durable, non-tacky and moisture resistant. The polyhydric alcohol is used in excess over that needed to take part in the cross-linking reaction and, when the protective overcoat is exposed to the heat of a fire, the excess polyhydric alcohol reacts with the ammonium polyphosphate to form a fire-retardant composition composed in major part of carbon and in minor part of phosphorus ash.

While each of the three ingredients necessary to form the fire-retardant protective overcoat of this invention has been used heretofore in fire-retardant compositions, this particular combination of ingredients is surprisingly effective in meeting the unique and difficult needs of the photographic art. Thus, for example, the coating composition exhibits excellent adhesion to both photographic emulsion layers and photographic support materials; the coating is transparent and colorless, hard yet flexible, tack-free and resistant to abrasion and moisture; and the components of the coating composition are fully compatible with photographic elements so as to exhibit no adverse effects with regard to the photographic image. Additionally, the materials employed are neither toxic nor flammable, nor do they generate highly toxic combustion products.

DESCRIPTION OF THE PREFERRED EMBODIMENTS

While the aqueous coating composition of this invention is described herein with particular relation to its use in forming an overcoat on a photographic element, it can, of course, be used with any other material which requires a fire-retardant protective overcoat, and is especially advantageous for use when it is necessary for the overcoat to be transparent. In use with photographic elements, it can be applied only to the image-bearing side of the element or only to the support side of the element or to both sides of the element.

Photographic elements which can be provided with a fire-retardant protective overcoat by use of the aqueous coating composition of this invention can be black-and-white elements, color elements formed from a negative in a negative-positive process, or color elements formed directly by a reversal process. The coating composition described herein provides strong bonding to all of these different types of photographic element without in any way adversely affecting the element itself. The photographic elements can comprise any of a wide variety of supports. Typical supports include cellulose nitrate film, cellulose acetate film, poly(vinyl acetal) film, polystyrene film, poly(ethylene terephthalate) film, polycarbonate film, glass, metal, paper, polymer-coated paper, and the like. The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example, gelatin, gelatin derivatives, cellulose derivatives, polysaccharides such as dextran, gum arabic, and the like, and synthetic polymeric substances such as water-soluble polyvinyl compounds like poly(vinylpyrrolidone), acrylamide polymers, and the like. A particularly common example of an image-forming layer is a gelatin/silver halide emulsion layer, and the compositions described herein provide excellent results in providing protective overcoats for such emulsion layers.

The first essential ingredient employed in forming the coating composition of this invention is a water-soluble ammonium polyphosphate. The water-soluble ammonium polyphosphates are well known commercially available materials. A particularly useful water-soluble ammonium polyphosphate for the purpose of this invention is sold by ALBRIGHT & WILSON AMERICAS INC. under the trademark AMGARD CL. The phosphorus content of this product is 13.1 percent by weight. Other suitable ammonium polyphosphates of differing phosphorus content and solubility are also available from ALBRIGHT & WILSON AMERICAS INC. under the trademarks AMGARD PI AND AMGARD TR.

The second essential ingredient employed in forming the coating composition of this invention is a water-soluble polyhydric alcohol. The polyhydric alcohol performs several functions in the composition. It serves to cross-link the film-forming copolymer and thereby produce a film which is hard, flexible, abrasion-resistant, non-tacky, and moisture resistant. It serves as a carbonific, that is a carbon source, and serves as a plasticizer for the cross-linked film. It is employed in excess of the amount needed to serve as the cross-linking agent, and the excess polyhydric alcohol is then available to react with the ammonium polyphosphate. The reaction involves the thermally initiated decomposition of the ammonium polyphosphate to form phosphoric acid and ammonia. The phosphoric acid then reacts with the polyhydric alcohol, which decomposes to form carbon and regenerate phosphoric acid. The reaction sequence can be illustrated as follows for an example in which the polyhydric alcohol employed is ethylene glycol:

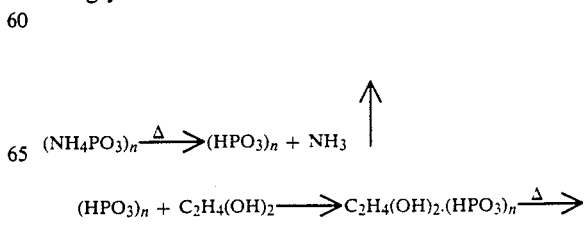

-continued $$C + H_2O + H_3PO_4$$

In addition to forming a carbon char by reaction with the polyhydric alcohol, the ammonium polyphosphate generates water, and since water has a high heat capacity this enhances the fire-retarding characteristics of the protective overcoat.

Examples of suitable water-soluble polyhydric alcohols for use in this invention include:
ethylene glycol
diethylene glycol
propylene glycol
trimethylene glycol
1,2-butanediol
1,3-butanediol
1,4-butanediol
pentamethylene glycol
hexamethylene glycol
glycerol
erythritol
sorbitol
pentaerythritol, and the like.

For the purposes of this invention, preferred polyhydric alcohols are those having two to six hydroxyl groups and two to twelve carbon atoms.

The third essential ingredient employed in forming the coating composition of this invention is a water-soluble film-forming copolymer of methyl vinyl ether and maleic anhydride. These copolymers are well known commercially available materials, sold, for example, under the trademark GANTREZ by GAF CHEMICALS CORPORATION. Examples of suitable copolymers for use in this invention include GANTREZ AN-119 Copolymer, GANTREZ AN-139 Copolymer, GANTREZ AN-149 Copolymer, GANTREZ AN-169 Copolymer and GANTREZ AN-179 Copolymer. The molecular weights of these copolymers range from 20,000 for GANTREZ AN-119 Copolymer to 80,000 for GANTREZ AN-179 Copolymer.

Copolymers of methyl vinyl ether and maleic anhydride can be represented by the formula:

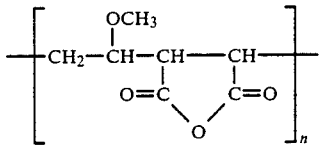

The copolymer cross-links via primary valence bonds by reaction with polyhydric alcohols, and is thereby rendered hard, durable, abrasion-resistant, and moisture-resistant while still retaining necessary flexibility for use as a protective overcoat on a photographic product.

The proportions of each of the three essential components employed in forming the protective overcoat of this invention can be varied widely, as desired. Typically, the copolymer of methyl vinyl ether and maleic anhydride is employed in an amount of from about 20 to about 75% by weight based on the weight of the dry overcoat; the polyhydric alcohol is employed in an amount of from about 5 to about 30% by weight based on the weight of the dry overcoat; and the ammonium polyphosphate is employed in an amount of from about 20 to about 60% by weight based on the weight of the dry overcoat. Optimum amounts are dependent upon the particular requirements involved, considering such factors as fire resistance, appearance, durability, ease of application and protection against physical abuse and environmental exposure.

In forming the aqueous coating solution, good results are obtained when water constitutes about 60 to about 80 percent by weight of the solution, the copolymer of methyl vinyl ether and maleic anhydride constitutes about 8 to about 24 percent by weight, the polyhydric alcohol constitutes about 2 to about 8 percent by weight, and the ammonium polyphosphate constitutes about 6 to about 20 percent by weight.

Commercially available photographic materials with which the fire-retardant protective overcoat of this invention is advantageously employed include KODAK DURACLEAR Film, KODAK DURATRANS Film and KODAK DURAFLEX Film.

In the practice of this invention, the particular ingredients and proportion of ingredients in the coating composition that will provide the best results is dependent on the composition of the photographic element. For example, the particular coating compositions which will provide optimum adhesion depend on the particular binder used in the image-bearing layer(s) or, if the element is to be coated on the support side, the particular material used as a support. A few simple experiments may be found to be necessary to formulate an optimum coating composition for any particular photographic element.

The photographic elements which are protected with fire-retardant overcoat layers in accordance with this invention are processed to form a visible image prior to being coated on the image-bearing side with the coating composition. Such processing can be carried out in any suitable manner. For example, black-and-white elements are typically processed in a sequence of steps comprising developing, fixing and washing, color prints in a sequence comprising color developing, bleaching, fixing (or combined bleach-fixing) and stabilizing, and color reversal elements in a sequence comprising black-and-white negative development, followed by reversal exposure or fogging, color development, bleaching, fixing (or combined bleach-fixing) and stabilizing. An advantageous manner of utilizing the invention described herein is to modify the conventional photographic processing operation to include, as final steps in the process following drying of the element, the steps of coating and drying to form the protective overcoat. The coating and drying steps can be carried out in a batch, semi-continuous or continuous manner, as desired.

Coating of the photographic element with the coating composition can be carried out in any convenient manner. For example, it can be carried out by dip coating, air-knife coating, roll coating, gravure coating, extrusion coating, bead coating, curtain coating, use of wire wound coating rods, brush, spray, and so forth. Typically, the wet coating deposited on the element will be in the range from about 40 to about 100 cubic centimeters of coating composition per square meter of surface coated, more usually in the range from about 50 to about 80 cubic centimeters of coating composition per square meter, and preferably about 70 cubic centimeters of coating composition per square meter. The viscosity of the coating composition can be varied to accomodate the particular method of coating which is chosen. Typically, satisfactory coatings can be readily formed on photographic elements from coating compositions having a viscosity in the range from about 25 to about 1,000 centipoises, and more preferably in the range from about 75 to about 200 centipoises.

Drying of the protective overcoat is conveniently accomplished by impinging heated air thereon, utilizing temperatures in the range of from about 50° to about 90° C. and times in the range of from about 2 to about 20 minutes.

The invention is further illustrated by the following example of its practice.

A coating solution was prepared from the following materials:

| Component | Amount (grams) |
|---|---|
| Water | 1800 |
| Ammonium Polyphosphate (AMGARD CL) | 480 |
| Copolymer of methyl vinyl ether and maleic anhydride (GANTREZ AN-119) | 600 |
| Ethylene glycol | 120 |

The coating solution was coated at a wet coverage of 70 grams per square meter on each surface of KODAK DURAFLEX Film and the coated material was dried at 80° C. for 10 minutes. The resulting overcoat layers were transparent, colorless, flexible, tack-free, resistant to abrasion, resistant to moisture and capable of providing effective protection against fire.

The combination of ingredients employed in this invention is uniquely effective in meeting the demanding requirements of the photographic art. Thus, the copolymer of methyl vinyl ether and maleic anhydride is a film-forming polymer which is able to form a continuous overcoat layer. It is water-soluble, so as to permit it to be coated from an aqueous solution, yet able to be rendered moisture-resistant in film form. The ability to be rendered moisture-resistant in film form results from the fact that it is cross-linkable and can be coated in admixture with a polyhydric alcohol which will readily bring about cross-linking when the coating is dried. The copolymer effectively forms a hard, durable yet flexible film with excellent adhesion to both surfaces of a photographic element. The protective coating formed from the copolymer is transparent and colorless, and application of the aqueous coating composition has no adverse effects on the photographic image. The ammonium polyphosphate utilized in the coating composition is a dehydrating agent which reacts rapidly with the polyhydric alcohol upon exposure to the heat of a fire. This reaction produces a carbon char, and combustion is thereby inhibited since the char does not burn readily, and also interferes with the access of heat and oxygen to the underlying surface. The polyhydric alcohol serves as a cross-linking agent for the copolymer and, since it is employed in excess of the amount required for cross-linking, the excess serves as a carbon source in the reaction with the ammonium polyphosphate. It also serves as a plasticizer and thereby reduces the brittleness of the cross-linked film. The three ingredients are all compatible with one another, are dissolvable in water to form the coating composition without undue difficulty, and have the important advantages of being safe and non-toxic and of generating combustion products which are relatively harmless.

The invention has been described in detail with particular reference to preferred embodiments thereof, but it will be understood that variations and modifications can be effected within the spirit and scope of the invention.

I claim:

1. An aqueous coating composition for use in forming a fire-retardant protective overcoat on a surface requiring such protection, said composition consisting essentially of an aqueous solution of:
   (1) a water-soluble film-forming cross-linkable copolymer of methyl vinyl ether and maleic anhydride,
   (2) a water-soluble polyhydric alcohol which serves to cross-link said copolymer when a coating of said composition is applied over said surface and dried, said polyhydric alcohol being present in said aqueous solution in an amount in excess of that needed to cross-link said copolymer,
   and (3) a water-soluble ammonium polyphosphate which reacts with said excess polyhydric alcohol to form a fire-retardant composition when said protective overcoat is exposed to the heat of a fire.

2. A coating composition as claimed in claim 1 containing about 60 to about 80 percent by weight of water, about 8 to about 24 percent by weight of said copolymer, about 2 to about 8 percent by weight of said polyhydric alcohol and about 6 to about 20 percent by weight of said ammonium polyphosphate.

3. A coating composition as claimed in claim 1 wherein said polyhydric alcohol contains two to six hydroxyl groups and two to twelve carbon atoms.

4. A coating composition as claimed in claim 1 wherein said polyhydric alcohol is ethylene glycol.

* * * * *